March 18, 1924.

J. P. POLSTER

CHAIN GRATE STOKER LINK

Filed Sept. 2, 1921

1,486,987

INVENTOR
John P. Polster
by
Owen Owen & Crampton

Patented Mar. 18, 1924.

1,486,987

UNITED STATES PATENT OFFICE.

JOHN P. POLSTER, OF TOLEDO, OHIO.

CHAIN-GRATE STOKER LINK.

Application filed September 2, 1921. Serial No. 497,872.

*To all whom it may concern:*

Be it known that I, JOHN P. POLSTER, a citizen of the United States, and a resident of Toledo, in the county of Lucas and State of Ohio, have made an Invention Appertaining to Chain-Grate Stoker Links; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a stoker link for stoker chains having angular passageways therethrough to permit the entrance of air for draft purposes, and to prevent the loss of finely divided fuel. It also has for its object to prevent the deposit of ash beneath the chain and thus causes delivery of all ash by the chain at the outer end of the belt into which the chain is formed. The invention also has for its object to provide in connection with a stoker chain, passageways that will be formed between the links which will be opened so as to automatically eject or deliver all particles that may collect in the passageways and thus prevent clogging of the passageways so as to keep a large proportion of the passageways open for the ingress of air into the combustion chamber through the fuel bed which the chain is used to convey from a delivery hopper to the combustion chamber, and to convey the ash from the combustion chamber and from the furnace. It particularly has for its object to provide in connection with such a chain, links having curved ledges so related and positioned to the adjoining links that overlapping portions will be provided completely around each of the links so as to present to the fuel as it is delivered from the hopper a substantially solid receiving surface except for small angular openings through which the air is directed to the fuel bed, and which is so formed as to prevent the egress of the finer particles of the fuel and the ash through the openings or between the links, thus producing a substantially non-sifting chain.

The invention may be used in links of different forms, and it may be used in chains that are assembled in different ways and still be within the purview of my invention as set forth in the combinations of elements forming the claims hereto appended. To illustrate a practical application of the invention I have selected stoker links of two different forms and shall describe them hereinafter. The links selected for purposes of illustration are shown in the accompanying drawings.

Figure 1:
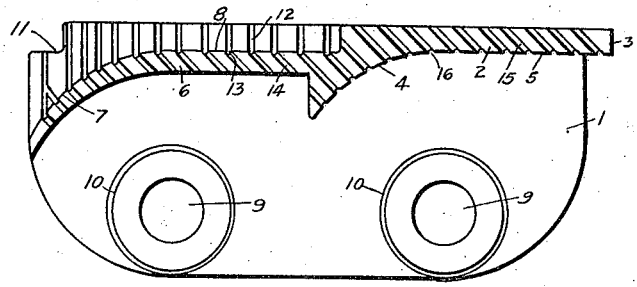
Figure 2:
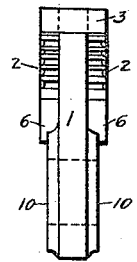
Figure 3:
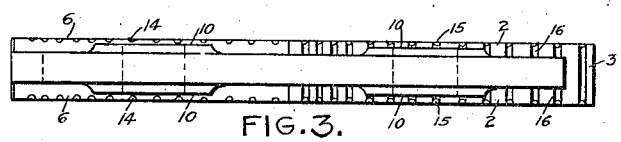
Figure 4:
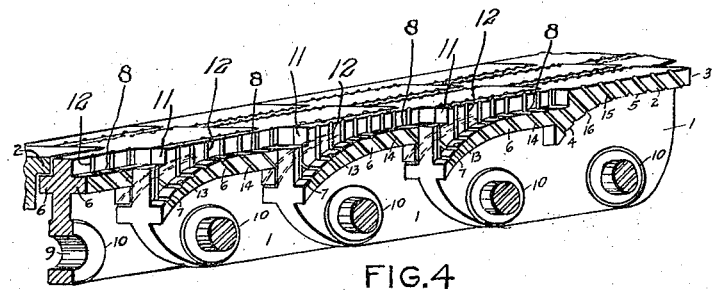
Figure 5:
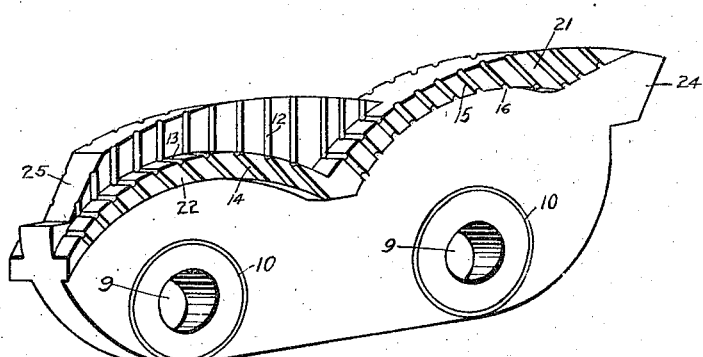

Figure 1 of the drawings illustrates a side view of one form of a link embodying my invention. Fig. 2 is an end view of the link illustrated in Fig. 1. Fig. 3 is a bottom view of the same. Fig. 4 is a perspective view showing the links assembled. Fig. 5 illustrates a modified form of link embodying my invention.

In constructions containing my invention there is provided a plurality of links that "break joint" and have overlapping portions that extend completely around the upper edges of the links.

1, in Figs. 1–4, indicates the body of the link. It is provided with ledges 2 that extend laterally from the web and a tongue 3 that protrudes from one end of the link. In the form of construction shown, the ledges 2 extend from one end to near the center of the top of the web. They are provided with curved surfaces 4 that extend tangential to the surfaces 5 that are located parallel to the top surface of the link. The link, in the form shown, is also provided with ridges 6 that extend from the ledges 2 to the other end of the link. The ridges 6 are also provided with curved surfaces 7 that extend tangentially from the plane surfaces 8, the latter surfaces also being parallel to the top surface of the link. The curved surfaces 7 and the plane surfaces 8 will fit below the curved surfaces 4 and the plane surfaces 5 of adjoining links, thus forming overlapping plane and curved surfaces between the adjoining links, the ledges of one fitting over the ridges of the other, and the surfaces 4 and 7 being concentric with openings 9 formed in the webs 1 through which inter-connecting rods extend and by means of which the links are joined together to form a chain.

Bosses 10 surround the openings 9 and form a spacing means to hold the ledges and ridges in proper position relative to each other. The links are also provided with notches 11 located at the ends of the links opposite to that on which the tongues 3 are located whereby the tongues 3 will fit the notches 11 of succeeding links.

The links are provided with small channels 12, 13, 14, 15 and 16. The channels 12 are located on the sides of the webs and above the ridges 6. The channels 13 extend from the lower ends of the channels 12 and across the tops of the ridges 6, while the channels 14 extend from the channels 13, diagonally downward and across the ridges 6. The channels 15 extend diagonally downward and across the ledges 2, while the channels 16 extend from the lower ends of the recesses 15 and at right angles to the surface of the web, that is, across the under surfaces of the ledges 2. When, therefore, adjoining links are placed in position when forming the chain the channels 15 will cross the channels 12 and will terminate in the corner formed between the ridge and the web, also the channels 16 which will extend parallel with the channels 13 will extend at right angles to the web 1 and will terminate at the corners formed between the ledges 2 and the web 1. This will form small passageways extending through the top of the grate to permit air to enter the combustion chamber and yet by reason of arrangement of the parts of the link, particularly as to the relative position of the surfaces of the ledges and ridges, fine particles of fuel will not be able to sift through the grate. Furthermore, the crossing of the channels and the movement of the parts of the adjoining links relative to each other will cause the links to clean themselves when delivering the ash.

The surfaces of the under sides of the ledges and the upper sides of the ridges extend substantially at right angles to the web of the link. Since the ledges overlap adjoining portions of adjoining links they permit the air to enter the combustion chamber and yet prevent the sifting of the finer particles of fuel and of the ash in the movement of the grate.

In the form of the invention illustrated in Fig. 5 the ledges 21 and ridges 22 are arcuate in form instead of being partially arcuate and straight, and so arranged that when they are assembled to form the chain, overlapping portions will be concentric with the openings 9 formed in the webs 23. The web moreover is provided with a protruding tongue 24 that is inclined with respect to a line passing through the center of the openings 9, while the other end of the link is provided with a notch 25 that corresponds in shape to the tongue 24, unless the ridges 21 meet above the longitudinal center line of the adjoining links. The ledges 21 and ridges 22 may be provided with recesses like the recesses 12, 13, 14 and 15 that are formed in links illustrated in Figs. 1–10 inclusive.

In assembling the links they are placed on rods that extend transversely through the chain, the links of one row being located in staggered relation with respect to the links of adjoining rows so that the links of one row overlap or "break joint" with the links of the other row, whereby the ledges and ridges and tongues of the links will overlap the corresponding parts of adjoining links. Thus the links form a substantially closed surface for supporting the fuel and yet the air may be forced into the combustion chamber of the furnace through the angular channels formed in the links.

When the links move over the sprocket wheels or drums and thus articulate relative to each other each link will move relative to the adjoining links and thus the parts, having the recesses through which the air passes, move relative to each other and disturb any particles of fuel or of ash that may have collected therein, and as the links are carried under at the ash delivering end of the chain the particles will fall from the recesses so that the chain will be cleaned of all particles that may have fallen or entered the recesses or between the overlapping parts of the links. This articulation of the links also occurs as they pass upward just before receiving the fuel. The chain is thus self-cleaning of all particles that may have lodged in the chain and prevents the clogging or plugging of the chain.

I have thus provided by my invention a chain of links for conveying fuel containing finely divided particles to the combustion chamber of a furnace and delivering the ash therefrom, which will permit the air to pass therethrough and yet which will not permit the sifting of the finer particles of fuel or ash through the chain.

I claim:

1. In a chain grate, a plurality of links arranged in rows lengthwise of the chain, the links of each row breaking joint with the links of the adjoining rows, each of the links having horizontally protruding lapping portions that extend and lap throughout the length of the links and form substantially vertical and horizontal contacting surfaces between juxtaposed links.

2. In a chain grate, a plurality of links arranged in rows lengthwise of the chain, the links of each row breaking joint with the links of the adjoining rows, each of the links having horizontally protruding lapping portions that extend and lap throughout the length of the links and form substantially vertical and horizontal contacting surfaces between juxtaposed links, the contacting surfaces having channels that form passageways for the air from the bottom to the top of the grate.

3. In a chain grate, a plurality of links arranged in rows lengthwise of the chain, the links of each row breaking joint with the links of the adjoining rows, each of the links having horizontally protruding lapping portions that extend and lap throughout the length of the links and form substantially vertical and horizontal contacting surfaces between juxtaposed links, the contacting surfaces having channels that form angular passageways for the air from the bottom to the top of the grate.

4. In a chain grate, a plurality of links arranged in rows lengthwise of the chain, the links of each row breaking joint with the links of the adjoining rows, each of the links having horizontally protruding lapping portions that extend and lap throughout the length of the links and form substantially vertical and horizontal contacting surfaces between juxtaposed links, the vertical contacting surfaces and the horizontal contacting surfaces having channels that form angular passageways between the horizontal and vertical contacting surfaces for the air from the bottom of the grate to the top of the grate.

5. In a chain grate, a plurality of links arranged in rows lengthwise of the chain, the links of each row breaking joint with the links of the adjoining rows, each of the links having horizontally protruding lapping portions that extend and lap throughout the length of the links and form substantially vertical and horizontal contacting surfaces between juxtaposed links, the vertical contacting surfaces and the horizontal contacting surfaces having channels, the channels of one contact surface being located at an angle to the channels of the surface with which it contacts, the said channels forming passageways for the air from the bottom of the grate to the top of the grate.

6. In a chain grate, a plurality of links arranged in rows lengthwise of the chain, the links of each row breaking joint with the links of the adjoining rows, each of the links having ledges and ridges the combined length of the ledges and ridges extending the length of the links, the ledges and ridges of each link lapping throughout its length with the ridges and ledges of the links of the adjoining rows.

7. In a chain grate, a plurality of links arranged in rows lengthwise of the chain, the links of each row breaking joint with the links of the adjoining rows, each of the links having curved ledges and ridges the combined length of the ledges and ridges extending the length of the links, the ledges and ridges of each link lapping throughout its length with the ridges and ledges of the links of the adjoining rows.

8. In a chain grate, a plurality of links arranged in rows lengthwise of the chain, the links of each row breaking joint with the links of the adjoining rows, each of the links having ledges and ridges that have curved portions, the combined length of ledges and ridges of each link extending the length of the links, the ledges and ridges of each link lapping throughout its length with the ridges and ledges of the links of the adjoining rows, the curved portions of the ledges fitting the curved portions of the ridges, rods for connecting the links together and located concentric with the curved portions of the ledges and ridges.

9. In a chain grate, a plurality of links arranged in rows lengthwise of the chain, the links of each row breaking joint with the links of the adjoining rows, each of the links having ledges and ridges the combined length of the ledges and ridges extending the length of the links, the ledges and ridges of each link lapping throughout its length with the ridges and ledges of the links of the adjoining rows, the contacting surfaces of the ridges and ledges having recesses that form air passageways.

10. In a chain grate, a plurality of links arranged in rows lengthwise of the chain, the links of each row breaking joint with the links of the adjoining rows, each of the links having ledges and ridges the combined length of the ledges and ridges extending the length of the links, the ledges and ridges of each link lapping throughout its length with the ridges and ledges of the links of the adjoining rows, the under side surfaces of the ridges having recesses that form air passageways.

11. In a chain grate, a plurality of links arranged in rows lengthwise of the chain, the links of each row breaking joint with the links of the adjoining rows, each of the links having ledges and ridges the combined length of the ledges and ridges extending the length of the links, the ledges and ridges of each link lapping throughout its length with the ridges and ledges of the links of the adjoining rows, the upper side surfaces of the ledges having recesses that form air passageways.

12. In a chain grate, a plurality of links arranged in rows lengthwise of the chain, the links of each row breaking joint with the links of the adjoining rows, each of the links having ledges and ridges the combined length of the ledges and ridges extending the length of the links, the ledges and ridges of each link lapping throughout its length with the ridges and ledges of the links of the adjoining rows, the vertical and under side surfaces of the ridges and the upper side surfaces of the ledges having recesses that form angular air passageways through the grate.

In testimony whereof, I have hereunto signed my name to this specification.

JOHN P. POLSTER.